United States Patent
Magno

(10) Patent No.: US 11,184,089 B2
(45) Date of Patent: Nov. 23, 2021

(54) RECEIVER DEVICE FOR TOUCH COMMUNICATION

(71) Applicant: ETH Zurich, Zürich (CH)

(72) Inventor: Michele Magno, Zürich (CH)

(73) Assignee: ETH Zürich, Zürich (CH)

( * ) Notice: Subject to any disclaimer, the term of this patent is extended or adjusted under 35 U.S.C. 154(b) by 44 days.

(21) Appl. No.: 16/644,897

(22) PCT Filed: Sep. 6, 2018

(86) PCT No.: PCT/EP2018/073990
§ 371 (c)(1),
(2) Date: Mar. 5, 2020

(87) PCT Pub. No.: WO2019/048539
PCT Pub. Date: Mar. 14, 2019

(65) Prior Publication Data
US 2020/0195044 A1    Jun. 18, 2020

(30) Foreign Application Priority Data
Sep. 7, 2017    (EP) .................................... 17189952

(51) Int. Cl.
*H04B 13/00*    (2006.01)
*H02J 50/00*    (2016.01)
(Continued)

(52) U.S. Cl.
CPC .......... *H04B 13/005* (2013.01); *H02J 50/001* (2020.01); *H02J 50/05* (2016.02); *H02J 7/345* (2013.01)

(58) Field of Classification Search
CPC .......... H02J 50/00; H02J 50/001; H02J 50/05; H04B 13/005; H04B 5/0012; H04B 5/0037
See application file for complete search history.

(56) References Cited

U.S. PATENT DOCUMENTS 6,211,799 B1    4/2001  Post et al.
6,282,407 B1 *  8/2001  Vega .................. G06K 7/10069
                                                    455/41.1
(Continued)

FOREIGN PATENT DOCUMENTS

EP    2 728 822 A2    5/2014
EP    3 107 208 A1   12/2016
WO    WO-2015170175 A1  11/2015

OTHER PUBLICATIONS

"Op-amp Comparator", Electronics tutorials, Jun. 12, 2017, retrieved via Wayback machine at <https://web.archive.org/web/20170612091602/https://www.electronics-tutorials.ws/opamp/op-amp-comparator.html> (Year: 2017).*

(Continued)

*Primary Examiner* — Hal Kaplan
*Assistant Examiner* — David A Shiao
(74) *Attorney, Agent, or Firm* — Blank Rome LLP

(57) ABSTRACT

According to the present invention there is provided a receiver device comprising, a first electrode (3) which can capacitive couple to an electrode of a transmitter device; a second electrode (5) which can capacitive couple to said electrode of said transmitter device; an energy harvesting circuit (7), which comprises a first capacitor (9), wherein said first electrode (3) is electrically connected to the energy harvesting circuit (7) so that energy from a signal which was transmitted from the electrode of the transmitter device and received at the first electrode (3), can be used to increase voltage across the first capacitor (9); and a comparator (15), wherein the first capacitor (9) is electrically connected to a positive supply input terminal (15c) of the comparator (15) so that voltage across the first capacitor (9) can be used to power the comparator (15); a demodulator circuit (11) wherein said second electrode (5) is electrically connected to the demodulator circuit (11); a first filter circuit (17), which (Continued)

comprises a second capacitor (32), which is electrically connected to an output (11*b*) of the demodulator circuit (11), so that energy from a signal which was transmitted from the electrode of the transmitter device and received at the second electrode (5) can be use to increase voltage across the second capacitor (32); wherein an output (11*b*) of the demodulator circuit (11) is electrically connected to a second input terminal (15*b*) of the comparator (15); and wherein the second capacitor (32) is electrically connected to a first input terminal (15*a*) of the comparator (15) so that the voltage across the second capacitor (32) defines a reference voltage at the first input terminal (15*a*) of the comparator 15; a second filter circuit (47) for filtering signals provided at an output terminal (15*e*) of the comparator (15). There is further provided an assembly which includes said receiver device, and a method of communication between a transmitter and the receiving device.

14 Claims, 3 Drawing Sheets

(51) Int. Cl.
*H02J 50/05* (2016.01)
*H02J 7/34* (2006.01)

(56) References Cited

U.S. PATENT DOCUMENTS

| | | | | |
|---|---|---|---|---|
| 6,879,809 | B1* | 4/2005 | Vega | G06K 7/0008 |
| | | | | 455/41.1 |
| 2007/0178857 | A1* | 8/2007 | Greene | H02J 7/025 |
| | | | | 455/127.1 |
| 2010/0045446 | A1* | 2/2010 | Hyun | H04Q 9/00 |
| | | | | 340/10.51 |
| 2011/0133895 | A1 | 6/2011 | Wu et al. | |
| 2012/0075009 | A1* | 3/2012 | Barrenscheen | H04B 5/0093 |
| | | | | 327/536 |
| 2012/0093245 | A1* | 4/2012 | Makdissi | A61B 5/0028 |
| | | | | 375/259 |
| 2015/0065043 | A1* | 3/2015 | Heng | H04L 7/0041 |
| | | | | 455/41.1 |
| 2015/0230707 | A1* | 8/2015 | Anderson | A61B 5/01 |
| | | | | 600/364 |
| 2016/0339257 | A1* | 11/2016 | Schaefer | A61N 1/36034 |
| 2017/0180075 | A1* | 6/2017 | Gollakota | H02J 50/001 |

OTHER PUBLICATIONS

International Search Report & Written Opinion for PCT/EP2018/073990, dated Oct. 2, 2018, 12 pages.

\* cited by examiner

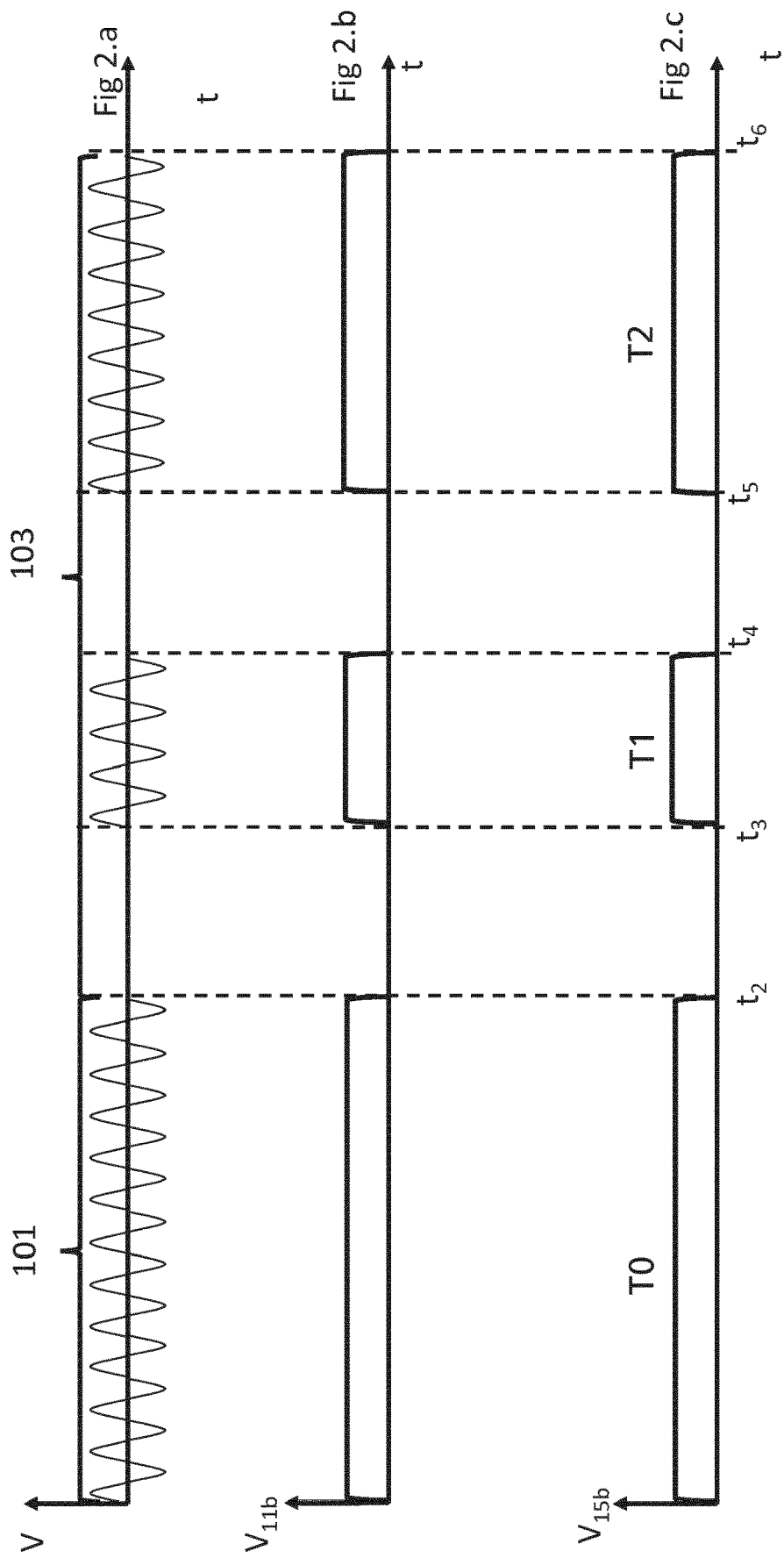

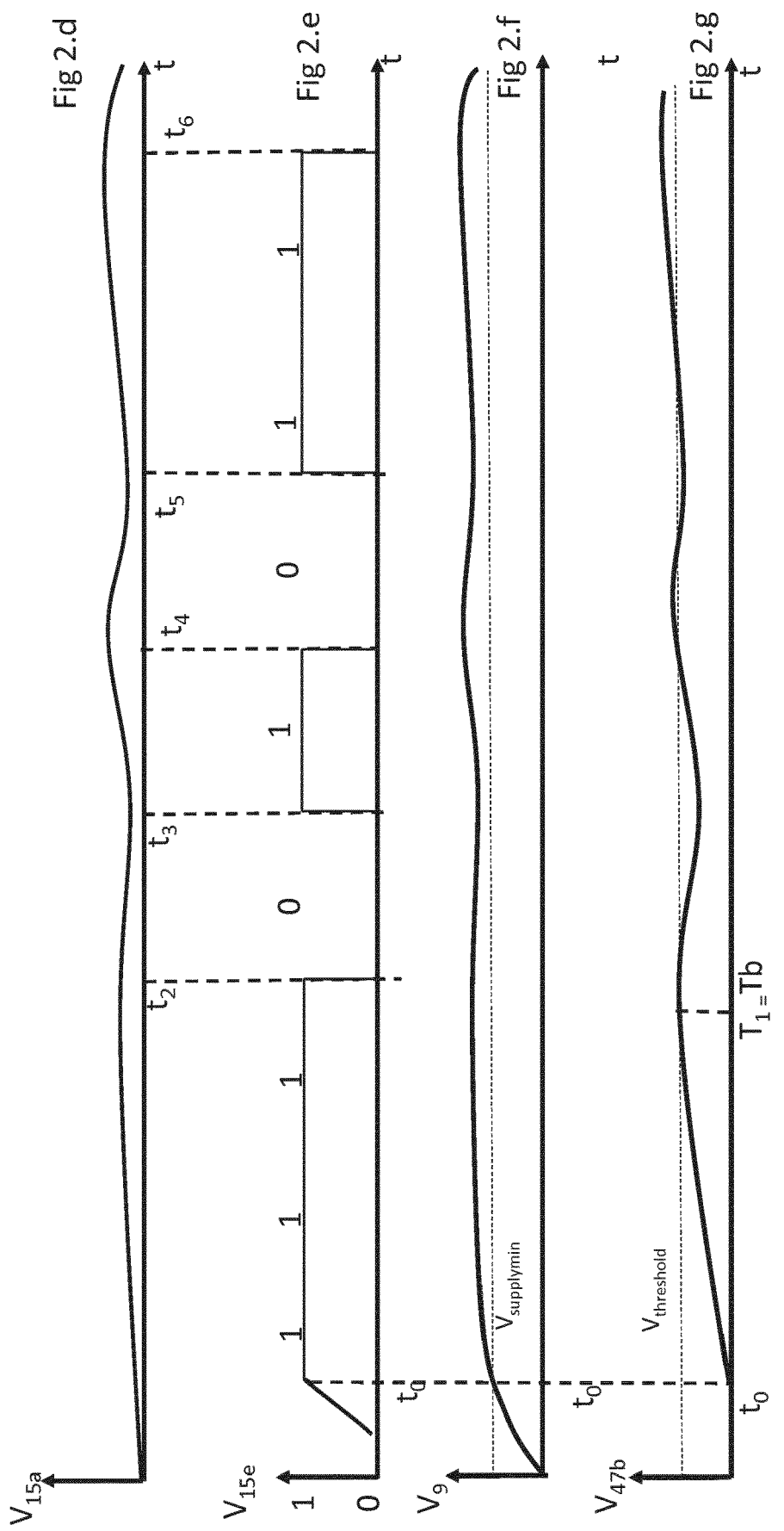

RECEIVER DEVICE FOR TOUCH COMMUNICATION

RELATED APPLICATIONS

This application is a national phase application of PCT/EP2018/073990, filed Sep. 6, 2018, which claims the benefit of European Patent Application No. EP17189952.9, filed on Sep. 7, 2017. The entire contents of those applications are hereby incorporated by reference.

FIELD OF THE INVENTION

The present invention concerns a receiver device, suitable for touch/heptic communication, which is configured to harvest energy from a signal received at an electrode of the receiver device. There is further provided an assembly which includes the receiver device and a method of communicating a signal from a transmitter to the receiver device.

DESCRIPTION OF RELATED ART

Intra-body and extra-body communication that uses the human body as a signal transmission medium is used in many wearable devices and touch communication systems. A problem with existing transmitter and receiver devices which are used in such communication systems is that they tend to consume a lot of power and therefore have only a short operational period before they need to be recharged.

In some existing solutions the transmitter and receiver devices require batteries as a power source; however for many applications it is not possible, or at least very inconvenient, to access the transmitter and receiver devices to replace the batteries.

It is an aim of the present invention to obviate or mitigate at least some of the disadvantages associated with the prior art.

BRIEF SUMMARY OF THE INVENTION

According to the invention, these aims are achieved by means of a receiver device comprising, a first electrode which can capacitive couple to an electrode of a transmitter device; a second electrode which can capacitive couple to said electrode of said transmitter device; an energy harvesting circuit, which comprises a first capacitor, wherein said first electrode is electrically connected to the energy harvesting circuit so that energy from a signal which was transmitted from the electrode of the transmitter device and received at the first electrode, can be used to increase voltage across the first capacitor; and a comparator, wherein the first capacitor is electrically connected to a positive supply input terminal of the comparator so that voltage across the first capacitor can be used to power the comparator; a demodulator circuit having an input and an output, and wherein the demodulator circuit is configured to provide at its output the envelope of a signal at said input; wherein said second electrode is electrically connected to the demodulator circuit; a first filter circuit, which comprises a second capacitor, which is electrically connected to an output of the demodulator circuit, so that energy from a signal which was transmitted from the electrode of the transmitter device and received at the second electrode can be use to increase voltage across the second capacitor; wherein an output of the demodulator circuit is electrically connected to a second input terminal of the comparator; and wherein the second capacitor is electrically connected to a first input terminal of the comparator so that the voltage across the second capacitor defines a reference voltage at the first input terminal of the comparator; a second filter circuit for filtering signals provided at an output terminal of the comparator. The receiver device is preferably a passive receiver device.

The first filter circuit may comprise, an input node which is electrically connected to an output of the demodulator circuit; an first output node which is electrically connected to the second input terminal of the comparator; a second output node which is electrically connected to the first input terminal of the comparator; a resistor which is electrically connected between the input node and the second output node; a further resistor which is connected between the first output node and ground; and wherein the second capacitor is connected between the second output node and ground.

The harvesting circuit may comprise a first diode and second diode, wherein the first diode is connected between ground and a first node, wherein the first node is between the first and second diodes; the second diode is connected between the first node and a second node, wherein the second node defines an output of the energy harvesting circuit; and wherein the first capacitor is connected between the second node and ground; wherein the energy harvesting further comprises, an inductor, a capacitor which is connected between the first node and the inductor; and a further capacitor which is connected between a third node and ground wherein the third node is a node between the first electrode and the first inductor.

The demodulator circuit may comprise an input node and an output node wherein the input node defines an input of the demodulator circuit and the output node defines an output of the demodulator circuit; wherein the demodulator circuit further comprises, a capacitor and a diode connected in series between the input node and output node, wherein an intermediate node is defined said capacitor and diode; a further capacitor which is connected between the output node of the demodulator circuit and ground; and a further diode which is connected between an intermediate node and ground.

The second filter circuit may comprise an input terminal which defines an input of the second filter circuit, and an output terminal which defines an output of the second filter circuit, wherein the input terminal of the second filter circuit is connected to the output terminal of the comparator so that the second filter circuit can receive signals which are output by the comparator; and wherein the second filter circuit may further comprise of a diode, a resistor and a capacitor, wherein said diode and said resistor may connected in series between the input terminal and the output terminal, and the capacitor is electrically connected between the output terminal and ground.

The receiver device may further comprise an impedance matching circuit which is configured to match an input impendence of the second electrode with an input impedance of the demodulator circuit.

The receiver device may further comprise a parsing circuit which is electrically connected to both an output terminal of the second filter circuit and to the output terminal of the comparator; and wherein the parsing circuit configured to read the signal(s) at the output terminal of the comparator only after the parsing circuit has received pre-defined series of signals from the output terminal of the second filter circuit.

The parsing circuit may be connected to a plurality of sub-circuits, each sub circuit having a respective address; and wherein the parsing circuit may be configured to provide an output which enables a sub-circuit in response to the parsing circuit reading a predefined series of signals at the output terminal of the comparator, said read predefined series of signals corresponding to the address of that sub-circuit.

The receiver device may be configured to be a wearable device; the wherein the first and second electrodes can be arranged such that they contact the skin of a user when a user wears the receiver device. For example the receiver device may take a form similar to a watch and strap.

According to a further aspect of the present invention there is further provided an assembly comprising, one or more transmitters which are configured to transmit a signal which comprises a preamble, and one or more receiver devices according to any one of the above mentioned receiver device embodiments.

In one embodiment said one or more transmitters may be configured to transmit a signal which comprises a preamble and data.

In another embodiment one or more transmitters are configured to transmit the signal though the body of a user that is wearing a receiver, to the first and second electrodes of the receiver device.

In one embodiment the first and second electrodes of the receiver device are arranged in contact with the skin of said user and the one or more transmitters are provided on an object. In another embodiment the one or more transmitters are provided in a wearable device, and the one or more transmitters are arranged such that the electrode(s) of the one or more transmitters are in contact with the skin of said user and the receiver device is provided on an object. In yet another embodiment both the receiver device and the transmitter are worn by the user; in such a case both the first and second electrodes of the receiver device and the electrode(s) of the one or more transmitters, are arranged in contact with the skin of said user.

According to a further aspect of the present invention there is provided a method of communicating a signal from a transmitter to a receiver device according to any one the above mentioned receiver device embodiments, the method comprising, transmitting a signal comprising a preamble from an electrode of the transmitter to both the first and second electrodes of the receiver device;

receiving said signal at the first and second electrode;

using energy from the preamble of the signal received at the first electrode to increase the voltage across the first capacitor;

using the voltage across the first capacitor to power the comparator;

using energy from the signal received at the second electrode to increase the voltage across the second capacitor of the first filter circuit;

using the voltage across the second capacitor to provide a reference voltage at the first input terminal of the comparator.

Preferably the voltage across the second capacitor is used to provide a reference voltage at the first input terminal of the comparator which in turn allows to reconstruct the data received.

The step of using energy from the signal received at the second electrode to increase the voltage across the second capacitor of the first filter circuit may comprise, using energy from the preamble of the signal received at the second electrode to increase the voltage across the second capacitor; and/or using energy from a portion of said signal which represents one or more data bits to increase the voltage across the second capacitor.

The method may further comprise the step of filtering an output of the comparator to remove non-zero outputs which have a period less than a predefined period so as to remove non-zero outputs which have resulted from the preamble of the signal received at the second electrode.

The method may further comprise matching the impedance of the second electrode with the impedance of the demodulator circuit.

The method may comprise the step of detecting a predefined sequence of signals output from the second filter, and sending a signal from the receiver device to an external circuit in response to detecting said predefined sequence of outputs, wherein the sent signal is configured to activate the external circuit.

The method may comprise the step of processing the signal received at the second electrode using a demodulator circuit to provide envelope of the received signal.

The step of transmitting a signal from an electrode of the transmitter to both the first and second electrodes of the receiver device, may comprise, transmitting said signal from an electrode of the transmitter, through the body of a user that is wearing the receiving device, to both the first and second electrodes of the receiver device.

The step of transmitting a signal from an electrode of the transmitter to both the first and second electrodes of the receiver device, may comprise transmitting said signal from an electrode of the transmitter, through the body of a user that is wearing the transmitter, to both the first and second electrodes of the receiver device.

In one preferred embodiment the transmitted signal has a frequency of 10 MHz. However it will be understood that the invention may work with different frequencies.

In one embodiment the receiver device is worn on the body of the user such that the first and second electrodes are in contact with the skin of the user, and the a transmitter device which transmits the signal is attached to an object; and wherein the method comprises the step of, detecting that the user touched the object based on whether the comparator provides a signal at its output or not, wherein if the user touches the object the comparator provides a signal at its output and if the user does not touch the object the comparator does not provide a signal at its output. It should be understood that alternatively the user may wear the transmitter such the electrode of the transmitter is in contact with the skin of the user, and the receiver device being provided on the object.

In an embodiment the transmitted signal comprises a preamble only.

In another embodiment the transmitted signal comprises a preamble and one or more portions which represent data; and the method may further comprise the step of, determining the data in the signal based on the output signals of the comparator.

BRIEF DESCRIPTION OF THE DRAWINGS

The invention will be better understood with the aid of the description of an embodiment given by way of example and illustrated by the figures, in which:

FIGS. 2a-2g illustrate the signals resulting in the receiver device in response to receiving an exemplary signal at the first and second electrodes of the receiver device.

DETAILED DESCRIPTION OF POSSIBLE EMBODIMENTS OF THE INVENTION

Figure 1:
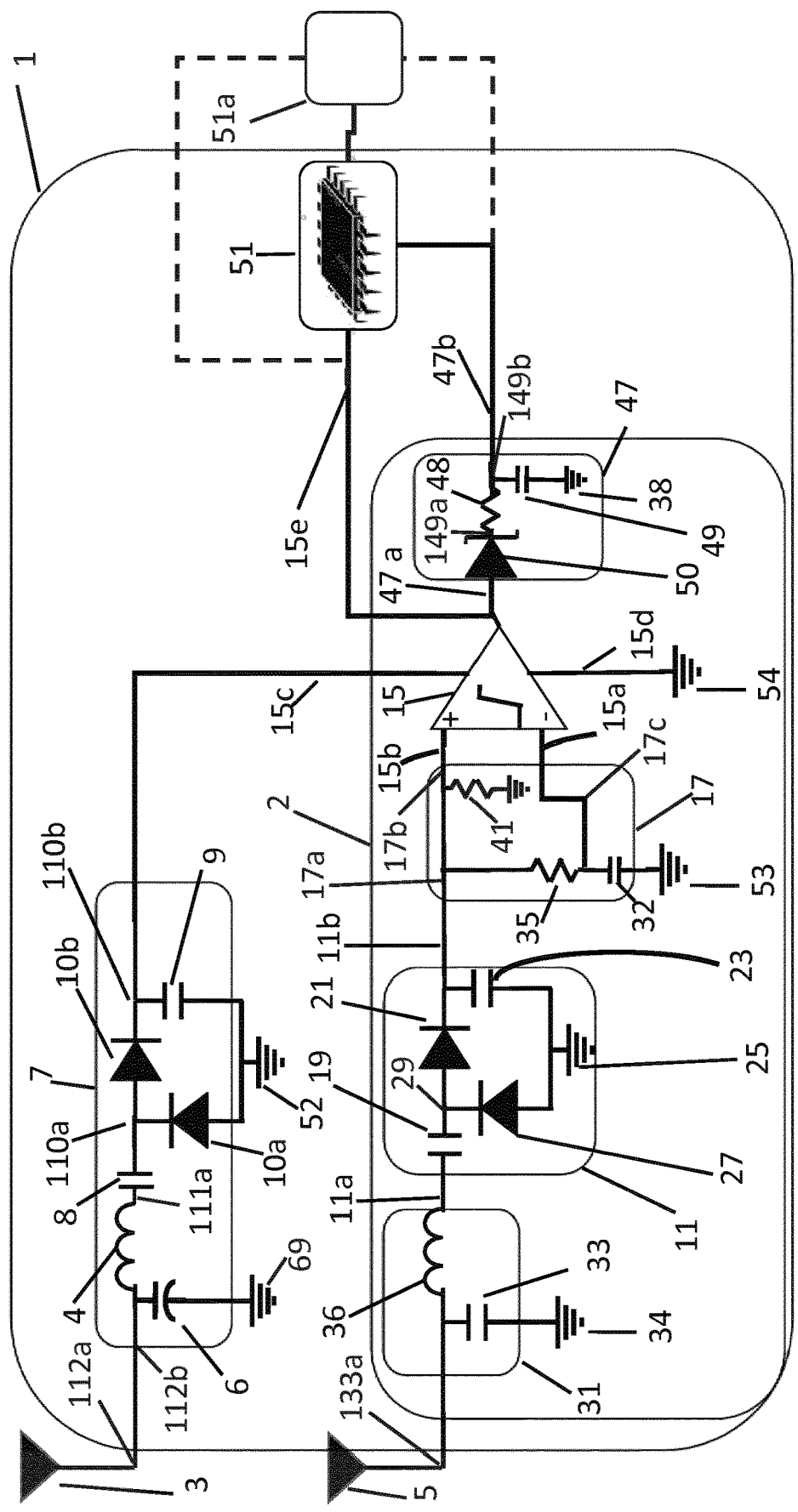
FIG. 1 is a schematic diagram illustrating the components of a receiver device according to an exemplary embodiment of the present invention.

FIG. 1 shows a schematic view of a receiver device 1 according to an embodiment of the present invention. The receiver device 1 comprises, a first electrode 3 which can capacitive couple to an electrode of a transmitter device and a second electrode 5 which can capacitive couple to said electrode of said transmitter device.

The first electrode 3 is electrically connected to an energy harvesting circuit 7. The energy harvesting circuit 7 comprises a first capacitor 9 which can store energy (U). The amount of energy (U) which is stored on the first capacitor 9 is given by the formula:

$$U = \tfrac{1}{2} C_9 V_9^2 \quad \text{(Equation 1)}$$

Wherein $C_9$ is the capacitance of the first capacitor 9 and $V_9$ its voltage across the first capacitor 9.

In the present invention, energy provided in a signal (e.g. energy provided in the preamble of the signal, and/or energy provided in data bits of the signal) which has been transmitted from the electrode of the transmitter device and retrieved at the first electrode 3, is used to increase the voltage across the first capacitor 9, thereby increasing the amount of energy stored in the first capacitor 9.

The energy harvesting circuit 7 further comprises a second capacitor 6, a third capacitor 8, a first inductor 4, a first schottky diode 10a and a second schottky diode 10b. The second capacitor 6, third capacitor 8, first inductor 4, first schottky diode 10a and second schottky diode 10b are arranged to collectively define a passive voltage doubler. The first schottky diode 10a is connected between ground and a first node 110a, wherein the first node 110a is between the first and second schottky diodes 10a,10b; the second schottky diode 10b is connected between the first node 110a and a second node 110b. The second node 110b defines the output of the energy harvesting circuit 7. The first capacitor 9 is connected between the second node 110b and ground. The third capacitor 8 is connected between the first node 110a and the first inductor 4. The second capacitor 6 is connected between a third node 112a and ground wherein the third node 112a is between the first electrode 3 and the first inductor 4. A fourth node 111a is located between the first inductor 4 and the third capacitor 8.

A signal received at the first electrode 3 will form a voltage ($V_{in}$) at the fourth node 111a according to the equation 2

$$V_{in} = \sqrt{P_r R_{EQ}} \quad \text{(Equation 2)}$$

where $P_r$ is the power of the signal received at the first electrode 3 and the $R_{EQ}$ is the equivalent resistant of the energy harvesting circuit 7 at the fourth node 111a. The voltage ($V_{in}$) at the fourth node 111a is rectified by the first and second schottky diodes 10a,10b, to form a rectified voltage at the second node 110b; this rectified voltage defines the voltage $V_9$ across the first capacitor 9. The rectified voltage at the second node 110b i.e. the voltage $V_9$ across the first capacitor 9, charges the first capacitor 9 thereby increase the voltage across the first capacitor 9, and thereby increasing the amount of energy stored in the first capacitor 9.

As mentioned, in this example, the energy harvesting circuit 7 further comprises a second capacitor 6, a third capacitor 8, and a first inductor 4. The first inductor 4 is connected between the second capacitor 6 and third capacitor 8; the second capacitor 6 is connected to ground and the third capacitor 8 is connected to the first node 110a and the third node 111a. Most preferably, the input impedance of the first electrode 3 is matched with the impedance of the rest of the circuit to maximize the amount of power ($P_r$) which is transferred from the signal which has been received at the first electrode 3, to the first capacitor 9 of the energy harvesting circuit 7. Thus in order to be able to transfer maximum amount of power from a signal received at the first electrode to the first capacitor 9 of the energy harvesting circuit 7, the capacitance of the second and third capacitors 6,8 and the inductance of the first inductor 4 are chosen such that the input impedance of the first electrode 3 at the third node 112a matches the input impedance of energy harvesting circuit 7 at the third node 112b, according to the formula $$Z_{input} = Z^*_{Reciever} \quad \text{(Equation 3)}$$

where $Z_{input}$ is the input impendence of the first electrode 3 and $Z^*_{Reciever}$ is the complex conjugate of the input impedance ($Z_{Reciever}$) of the energy harvesting circuit 7.

The receiver device 1 further comprises a low power receiver 2 that comprises a comparator 15, which has a first input terminal 15a, a second input terminal 15b, a positive voltage supply terminal 15c, a negative voltage supply terminal 15d and an output terminal 15e. The second node 110b is electrically connected to the positive voltage supply terminal 15c so that voltage across the first capacitor 9 (which has resulted from the energy provided by the signal received at the first electrode 3) can be used to supply power to the comparator 15. The negative voltage supply terminal 15d is connected to ground.

The comparator 15 requires a predefined minimum voltage ($V_{supplymin}$) to its positive voltage supply terminal 15c in order to be operational. When the voltage across the first capacitor 9 reaches a voltage which is equal to, or greater than, the predefined minimum voltage ($V_{supplymin}$), the first capacitor 9 supplies the positive voltage supply terminal 15c with said necessary minimum voltage ($V_{supplymin}$) required to make the comparator 15 operational.

The voltage across the first capacitor 9 is used as buffer to supply the positive voltage supply terminal 15c of the comparator 15. The voltage that is across the first capacitor 9 the more is the energy buffer accumulated according to (Equation 1) that can be used to supply the positive voltage supply terminal 15c of the comparator 15.

Preferably, during use, the voltage to which the first capacitor 9 is charged, depends on the number of bits in the signal (which is to be transmitted from the electrode of the transmitter device and received at the second electrode 5) which are to be compared at the comparator 15. For example, if $U_{min}$ is the minimum energy required for the comparator 15 to compare one bit of a signal received at the second electrode 5, then in order to compare a signal which has eight bits the first capacitor 9 must have sufficient voltage across it so that it supply the comparator 15 with $U_{min}*8$ amount of energy. We call $U_{message}$ the minimal energy which the comparator 15 needs in order to compare all of the bits (i.e. at least all of the data bits) which are present in a signal received at the second electrode 5. The voltage required across the first capacitor 9 in order to provide the comparator 15 with any given amount of energy is determined using the afore-mentioned equation 1. Most preferably, during use, the first capacitor 9 is charged to a minimum voltage ($V_{min}$) wherein the minimum voltage ($V_{min}$) is the minimum voltage required to provide the comparator 15 with the minimal energy $U_{message}$ which the comparator 15 needs in order to compare all of the bits (i.e. at least all of the data bits) which are present in a signal received at the second electrode 5.

As previously mentioned, in the present invention, energy, provided in a signal which has been transmitted from the electrode of the transmitter device and received at the first electrode 3, is used to increase the voltage across the first capacitor 9, thereby increasing the amount of energy stored in the first capacitor 9. So in this embodiment the same signal which has been transmitted from the electrode of the transmitter device is received at both the first electrode 3 and the second electrodes 5; the signal received at the first electrode 3 is used to increase the amount of energy stored in the first capacitor 9 so that the comparator 15 becomes operational, and the signal received at the second electrode 5 (or at least all of the data bits in the signal received at the second electrode 5) undergoes comparison at the comparator 15.

In this embodiment a signal which has been transmitted from the electrode of the transmitter device and received at the first electrode 3 and second electrode 5, will preferably comprise a preamble and data bits. Energy, provided in a preamble of said signal which is received at the first electrode 3 is used to increase the voltage across the first capacitor 9, thereby increasing the amount of energy stored in the first capacitor 9. Therefore in order to charge the first capacitor 9 so that it has at least said minimum voltage ($V_{min}$) the transmitter transmits the preamble before transmitting the data bits. When the preamble is received at the first receiver 3, the energy provided in a preamble of a signal is used to increase the voltage across the first capacitor 9 to said minimum voltage ($V_{min}$). The length of the preamble $L_{min}$ is equal to or greater than the length needed for to increase the voltage across the first capacitor 9 to said minimum voltage ($V_{min}$). If said minimum voltage ($V_{min}$) is a small value then the length of the preamble $L_{min}$ will be less compared to if the minimum voltage ($V_{min}$) is a larger value. Accordingly the length of the preamble $L_{min}$ which is transmitted is proportional to the said minimum voltage ($V_{min}$) (and thus is also proportional to the minimal energy $U_{message}$).

Upon receipt of the preamble at the first electrode 3, the preamble generates a voltage ($V_{in}$) at the fourth node 111a according to equation 2. The voltage ($V_{in}$) at the fourth node 111a is rectified by the first and second schottky diodes 10a,10b, to form a rectified voltage at the second node 110b; this rectified voltage defines the voltage $V_9$ across the first capacitor 9. The rectified voltage at the second node 110b i.e. the voltage $V_9$ across the first capacitor 9, charges the first capacitor 9 thereby increase the voltage across the first capacitor 9, and thereby increasing the amount of energy stored in the first capacitor 9.

The rectified voltage at the second node 110b charges the first capacitor 9 thereby increasing the voltage $V_9$ across the first capacitor 9, from zero volt to the $V_{message}$ according to equation 1. The length of the preamble $L_{min}$ is equal to or greater than the length needed for to increase the voltage across the first capacitor 9 to said minimum voltage ($V_{min}$) or greater, thereby providing the first capacitor 9 with a voltage which is sufficient to enable the first capacitor 9 to supply the comparator 15 with at least the minimal energy $U_{message}$ which the comparator 15 needs in order to compare all of the data bits contained in the signal. Once the voltage across the first capacitor 9 has increased to said minimum voltage ($V_{min}$) or greater, then the comparator 15 will be turned on by the voltage supplied by the first capacitor 9 to the positive voltage supply terminal 15c of the comparator 15; the comparator can then begin to compare the data bits of said signal which was received at the second electrode 5.

The low power receiver 2 further comprises a demodulator circuit 11. The second electrode 5 is electrically connected to a demodulator circuit 11; in this example the second electrode 5 is electrically connected to a demodulator circuit 11 through an impedance matching circuit 31, however it will be understood that the impedance matching circuit 31 is optional, and is not an essential feature of the present invention. It will be understood that the demodulator circuit 11 may take any suitable configuration. In this example the demodulator circuit 11 is in the form of an envelope detector 11. Most preferably the envelope detector 11 is passive i.e. a passive envelope detector 11. An envelope detector 11 is an electronic circuit which can receive a signal and provide an output which is the envelope of that signal.

In this example the demodulator circuit 11 comprises an input node 11a and an output node 11b; the input node 11a defines an input of the demodulator circuit 11; the output node 11b defined an output of the demodulator circuit 11. The input node 11a of the demodulator circuit 11 is electrically connected to the second electrode 5 via the impedance matching circuit 31, and the output node 11b which is electrically connected to a first filter circuit 17.

The demodulator circuit 11 comprises a fourth capacitor 19 and a third diode 21 connected in series between the input node 11a and output node 11b of the demodulator circuit 11; a fifth capacitor 23 which is connected between the output node 11b of the demodulator circuit 11 and ground 25; and a fourth diode 27 connected between an intermediate node 29 and ground 25, wherein said intermediate node 29 is located between the fourth capacitor 19 and the first diode 21.

This implementation of the demodulator circuit 11 provides at its output terminal 11b, the envelope of a signal received at its input terminal 11b. Most preferably a transmitter transmits a signal to the first and second electrode 3,5 using an on-off keying modulation. On-off keying modulation is a form of amplitude-shift keying (ASK) modulation that represents digital data (bits) at the presence or absence of the carrier frequency. The transmitter sends the bit '1' there is presence of carrier frequency in the signal; when the transmitter sends the bit '0', the carrier frequency is not present in the signal. So the signal and the received power arrive to the electrodes 3 and 5 only when bits '1' are transmitted. In this example the signal which is transmitted by the transmitter to the first and second electrode 3,5 comprises a preamble (sequence of bits '1' where the carrier frequency is always present) and data bits (sequences of bit 1 and 0 according to the messages sent); as already described the bits which are present in the preamble of the signal which received at the first electrode 3 is used to charge the first capacitor 9 to have a said minimum voltage ($V_{min}$) or greater so that the first capacitor 9 can power the comparator 15 to make the comparator 15 operational. While the successive sequence of bits in the signal are used as data bits. These data bits are compared at the comparator 15.

The third and fourth diodes 21,27 are each zero-bias diodes that do not need to be supplied so the signal is not reduced.

The voltage across the firth capacitor 23 increases when the signal with carrier frequency (bit '1') reaches the input node 11a of the demodulator circuit 11, and decrease when there is no signal (bit '0'), reconstructing the bit 1 and 0. The voltage across the fifth capacitor 23 (i.e. the voltage ($V_{11b}$) at the output node 11b of the demodulator circuit 11)

depends on the voltage which is at the input node 11a of the demodulator circuit 11 (in other words the voltage ($V_{11b}$) at the output node 11b depends on the voltage ($V_{11a}$) which is at the input node 11a) according to the equation:

$$V_{11b}=2(V_{11a}-V_{bias}), \quad \text{(equation 5)}$$

Wherein $V_{bias}$ is the bias voltage of the third diode 21 and fourth diode 27, which is very small for zero-bias diodes, and the voltage ($V_{11a}$) which is at the input node 11a is:

$$V_{11a}=\sqrt{P_{r5}R_{\text{EQdemodulator}}} \quad \text{(Equation 6)}$$

Wherein $P_{r5}$ is the power of the signal which has been received from at second electrode 5 (said signal containing some non-zero bit i.e. bits with the value of '1'); and $R_{EQdemodulator}$ is the equivalent resistance of the demodulation circuits at the input node 11a of the demodulator circuit 11.

As mentioned, in this example the input node 11a of the demodulator circuit 11 is not directly electrically connected to the second electrode 5; rather there is a matching circuit 31 which is electrically connected between the second electrode 5 and the input node 11a of the demodulator circuit 11; however it will be understood that the matching circuit 31 is an optional feature and it can be implemented in any suitable configuration. In other words in another exemplary embodiment the input node 11a of the demodulator circuit 11 is directly electrically connected to the second electrode 5 or using another matching network with different architecture. It will be understood that the demodulator circuit 11 and the impedance matching circuit 31 take any suitable configuration.

In this example the impedance matching circuit 31 comprises a second inductor 36 and a sixth capacitor 33; the second inductor 36 is connected between an input node 133a of the impedance matching circuit 31 and the input node 11a of the demodulator circuit 11; and the sixth capacitor 33 is connected between the input node 133a of the matching circuit 31 and ground. The input node 133a of the impedance matching circuit 31 defines an input of the impedance matching circuit 31.

The impedance matching circuit 31 is configured to match the input impendence of the second electrode 5 with the input impedance of the demodulator circuit 11, according to equation:

$$Z_{Electrode5}=Z^*_{Dem}. \quad \text{(Equation 4)}$$

Wherein $Z_{Electrode5}$ is the input impedance of the electrode 5 and $Z^*_{Dem}$ is the complex conjugate of the input impedance $Z_{Dem}$ of low power receiver 2 at the input node 133a of the impedance matching circuit 31. The capacitance of the sixth capacitor 33 and the inductance of second inductor 36 are selected to satisfy equation 4.

As mentioned the output node 11b of the demodulator circuit 11 is electrically connected to a first filter circuit 17. The first filter circuit 17 has an input node 17a which is electrically connected to the output node 11b of the demodulator circuit 11; and an first output node 17b which is electrically connected to the second input terminal 15b of the comparator 15; a second output node 17c which is electrically connected to the first input terminal 15a of the comparator 15.

The first filter circuit 17 comprises a first resistance 35 and the seventh capacitor 32; the first resistance 35 and the seventh capacitor 32 achieve a passive low pass filter. The first resistor 35 is electrically connected between the input node 17a and an intermediate node 17c; and the seventh capacitor 32 is electrically connected between the intermediate node 17c and ground; the intermediate node 17c is electrically connected to the first input terminal 15a of the comparator 15. The voltage at the intermediate node 17c defines the voltage at the first input terminal 15a of the comparator 15.

The value of the first resistance 35 and seventh capacitor 32 are such as to keep the voltage at the intermediate node 17c (i.e. voltage (Visa) at the first input terminal 15a of the comparator 15) below the maximum value of the voltage which occurs at the input node 17a (i.e. below a maximum value of the voltage ($V_{11b}$) which occurs at the output 11b of the demodulator circuit 11) when a signal having bits '1' is received at the second electrode 5, according to the following equation:

$$V_{15a} = \frac{1}{R_{35}C_{32}}\int_0^t V_{11b}dt \quad \text{(equation 7)}$$

wherein $R_{35}$ is the resistance of the first resistance 35 and $C_{23}$ is the capacitance of the seventh capacitor 32; and $V_{11b}$ is the voltage which occurs at the output 11b of the demodulator circuit 11 (i.e. the voltage at the input node 17a of the first filter circuit 17); and Visa is the voltage at the first input terminal 15a of the comparator 15 (i.e. the voltage at the first output node 17b of the first filter circuit 17).

The first filter circuit 17 further comprises a second resistor 41 which is electrically connected between the input node 17a and ground. The second resistor 41 is used to discharge the seventh capacitor 35 faster when a bit '0' (no power in the signal received on second electrode 5). The resistance of the second resistor is selected such that following equation 8 is satisfied:

$$V_{11b}(t) = e^{-\frac{1}{R_{41}C_{23}}} \quad \text{(equation 8)}$$

where $R_{41}$ is the resistance of the second resistor 41; $C_{23}$ is the capacitance of the fifth capacitor 23 in the demodulator circuit 11; and $V_{11b}$ is the voltage which occurs at the output 11b of the demodulator circuit 11 (i.e. the voltage at the input node 17a of the first filter circuit 17).

The first filter circuit 17 is used to generate a reference signal at the first input terminal 15a of the comparator 15 (the first input terminal 15a of the comparator 15 electrically connected to the first output node 17b of the first filter circuit 17); the signals provided at the second input terminal 15b of the comparator 15 are compared to the reference signal at the first input terminal 15a of the comparator 15. The signal which is provided at the output node 11b of the demodulator circuit 11 is filtered using the first filter circuit 17. The first filter 17 allows the comparator 15 to generate an 'high' value (i.e. a non-zero value such as bit of value "1") at its output terminal 15e when a data bit of signal received at the second electrode 5 has a value '1'; and allows the comparator 15 to generate an low' value (i.e. a zero value such as bit of value "0") at its output terminal 15e when a data bit of signal received at the second electrode 5 has a value '0'.

The receiver device 2 further comprises a second filter circuit 47, which is connected to the output terminal 15e of the comparator 15. The second filter circuit 47 is configured to filter out signals, which are output by the comparator 15 (i.e. provided at the output terminal 15e of the comparator 15) which have a non-zero value for a period less than a predefined threshold period.

The second filter circuit 47 comprises an input terminal 47a which defines an input of the second filter circuit 47, and an output terminal 47b which defines an output of the second filter circuit 47. The input terminal 47a of the second filter circuit 47 is connected to the output terminal 15e of the comparator 15 so that the second filter circuit 47 can receive signals which are output by the comparator 15. The second filter circuit 47 comprises of a fifth diode 50, which is a schottky diode 50; and a third resistor 48 and eighth capacitor 49 which are arranged to provide a passive low pass filter.

The fifth diode 50 is electrically connected between the input terminal 47a and a first intermediate node 149a; the third resistor 48 is electrically connected between the first intermediate node 149a and a second intermediate node 149b, the second intermediate node 149b is electrically connected to the output terminal 47b of the second filter circuit 47. The eight capacitor 49 is electrically connected between the second intermediate node 149b and ground. The third resistor 48 and the eight capacitor 49 define an RC filter to achieve a passive low pass filter. The second intermediate node 149b is connected to the output terminal 47b of the second filter circuit 47.

As mentioned the second filter circuit 47 is configured to filter out signals, which are output by the comparator 15, which have a non-zero value for a period less than a predefined threshold period. Said predefined threshold period is dictated by the choosing, the appropriate resistances for the third resistor 48, the appropriate capacitance for the eighth capacitor 49 according to equation 9:

$$V_{149b} = \frac{1}{R_{48}C_{49}} \int_0^\tau V_{149a} dt \quad \text{(equation 9)}$$

Wherein $R_{48}$ is the resistance of the third resistor 48; $C_{49}$ appropriate capacitance for the eighth capacitor 49; $V_{149b}$ is voltage at the second intermediate node 149b (i.e. the voltage at the output terminal 47b of the second filter circuit 47); and $V_{149a}$ is voltage at the first intermediate node 149a (i.e. the voltage at the node 149a which is between the fifth diode 50 and the third resistor 48).

The value of $V_{149b}$ increases from zero to a predefined threshold value $V_{threshold}$, or greater, according to equation 9. The predefined threshold value $V_{threshold}$ is the minimal value of voltage that defines a 'high'. The predefined threshold value $V_{threshold}$ may be 1.8 volts in CMOS logic supplied at 3V for example; above 1.8 volts is considered a 'high' and below 1.8 volts is considered a 'low'; for other logic the predefined threshold value $V_{threshold}$ can be higher or lower than 1.8 volts. In another example an external circuit (such as external digital logic circuit 51a) may be electrically connected to the output terminal 47b of the second filter circuit 47; when the voltage the output terminal 47b of the second filter circuit 47 reaches a threshold value then the external circuit is powered on (i.e. woken-up); in such an example said predefined threshold value $V_{threshold}$, may be equal to the threshold voltage value required to power-on (i.e. wake-up) the external circuit.

In this particular example, the receiver device 1 further comprises a parsing circuit 51 (which may optionally implemented by an ultra-low power 8-bits microcontroller which may be powered by a small energy buffer, such as a battery) which is electrically connected to the output terminal 47b of the second filter circuit 47. The parsing circuit 51 is further electrically connect to the output terminal 15e of the comparator 15. The parsing circuit 51 comprises an output terminal 51a. The output terminal 51a may be connected to external digital logic or devices (not shown); and when the parsing circuit 51 provides a predefined output signal at its output terminal 51a, the external digital logic or device is powered-on (i.e. woken up).

It should be understood that the parsing circuit 51 is an optional feature, and is not an essential feature of the present invention (for example in another exemplary embodiment there is no parsing circuit 51 provided, and the output terminal 47b of the second filter circuit 47 is electrically connected, directly, to an external digital logic circuit).

The parsing circuit 51 is configured to monitor when the second filter circuit terminal 47b reaches a predefined threshold value $V_{threshold}$, or greater (as already mentioned the predefined value $V_{threshold}$ is the minimal value of voltage that defines a 'high'). The parsing circuit 51 is configured to read the value which is provided at the output terminal 15e of the comparator 15 only if the voltage at the output terminal 47b ($V_{149b}$) of the second filter circuit 47 reaches the predefined threshold value $V_{threshold}$, or greater. The parsing circuit 51 provides a predefined output signal at its output terminal 51a when the parsing circuit reads a predefined series values have been provided at the output terminal 15e of the comparator 15. As mentioned the output terminal 51a may be connected to external digital logic or devices (not shown); and when the parsing circuit 51 provides said predefined output signal at its output terminal 51a, the external digital logic or device is powered-on (i.e. woken up).

By filtering out signals, which are output by the comparator 15, which have a non-zero value for a period less than a predefined threshold period, the second filter circuit 47 has the effect of ensuring that noise signals which may occur at the output terminal 15e (i.e. which may occur at the input terminal 47a of the second filter circuit 47) does not reach the parsing circuit 51. Otherwise these noise signals could, undesirably, cause the parsing circuit 51 to inadvertently provide said predefined output signal at its output terminal 51a.

For example the parsing circuit 51 may be connected to a plurality of external circuits or external devices, each having a respective address. Each address may be represented by a series of bits (e.g. an 8 bit address). The parsing circuit 51 may be configured to monitor signals provided at the output terminal 15e of the comparator 15 (i.e. the parsing circuit 51 may be configured to monitor the bit values which are provided at the output terminal 15e of the comparator 15); and when the parsing circuit 51 detects that a series of bits, corresponding to an address of one of the external circuits or external devices, have been provided at the output terminal 15e of the comparator 15, then the parsing circuit 51 will send an activation signal along its output terminal 51a to the external circuit or external device having that corresponding address, to activate that external circuit or external device.

In another exemplary embodiment there is no parsing circuit 51 provided, and the output terminal 47b of the second filter circuit 47 is electrically connected, directly, to an external digital logic circuit. The external digital logic circuit is further electrically connected to the output terminal 15e of the comparator 15. The external digital logic circuit is configured to read the value which is provided at the output terminal 15e of the comparator 15 only if the voltage at the output terminal 47b ($V_{149b}$) of the second filter circuit 47 reaches a predefined threshold value $V_{threshold}$, or greater (as already mentioned the predefined value $V_{threshold}$ is the minimal value of voltage that defines a 'high'). By filtering out signals, which are output by the comparator 15, which have a non-zero value for a period less than a predefined threshold period, the second filter circuit 47 has the effect of ensuring that noise signals which may occur at the output terminal 15e (i.e. which may occur at the input terminal 47a of the second filter circuit 47) reaches the external digital logic. Otherwise these noise signals could, undesirably, cause the external digital logic circuit to read the value which is provided at the output terminal 15e of the comparator 15

In the preferred embodiment the receiver device 1 is incorporated into a wearable device, wherein the receiver device 1 is arranged in the wearable device such that the first and second electrode 3,5 contact the skin of the user when the device is worn by the user.

The receiver device 1 shown in FIG. 1 can be used to implement a method according to the present invention. During use, the receiver device 1 is moved by the user to bring both the first and second electrodes 3,5 into capacitive coupling with an electrode of a transmitter. In other words the receiver device 1 is moved by the user to so that the first electrode 3 and the electrode of a transmitter form a first capacitor and so that the second electrode 5 and the electrode of a transmitter form a second capacitor.

Once the first and second electrodes of the receiver device 1 have been arranged to capacitive couple with an electrode of a transmitter, then the transmitter transmits a signal from said electrode of the transmitter to the first and second electrodes 3,5 of the receiver device 1. The transmitted signal comprises at least a preamble. In one embodiment, the transmitted signal comprises a preamble only, and in another embodiment the transmitted signal comprises a preamble plus data. A preamble is preferably a portion at the beginning of a signal which has a bit value of '1' for a predefined length of time; most preferably the length of the preamble is $L_{min}$, which is, as discussed above, equal to or greater than the length needed for to increase the voltage across the first capacitor 9 to said minimum voltage ($V_{min}$). Said signal is transmitted by the transmitter and received by the first and second electrodes 3 and 5;

In one embodiment the signal is transmitted from the electrode of the transmitter, through the body of a user that is wearing the receiver device, to the first and second electrode 3,5 of the receiver device 1. In one embodiment receiver device 1 is provided in a wearable device which is worn by the user, and the first and second electrode 3,5 both touch the skin of the user. The transmitter is provided on an object; the electrode of the transmitter is in contact with the object (preferably said object is electrically conducting). It should be understood that, alternatively the receiver device 1 may be provided on the object, and the transmitter worn by the user.

In this particular embodiment the users arranges the first and second electrodes of the receiver device 1 to capacitive couple with an electrode of a transmitter by touching the object with part of their body (e.g. with their finger). The signal which is transmitted by the transmitter is passed through the body of user to the first and second electrodes 3,5 of the receiver device 1. In one example the object may be an inanimate object; in yet another example the object is another person (i.e. a person other than the person who is wearing said receiver device 1). Sending signals through the body of a user, from a transmitter which is in contact with an object (e.g. an inanimate object or another person), to a receiver device 1 which is worn by a user, is referred to as extra-body communication.

One embodiment may comprise the step of detecting that the user, who is wearing the receiver device 1 so that the first and second electrode 3,5 both touch the skin of the user, touched an object (on which a transmitted has been provided) based on whether the comparator 15 provides a signal at its output terminal 15e or not, wherein if the user touches the object the comparator 15 provides a signal at its output terminal 15e, and if the user does not touch the object the comparator 15 does not provide a signal at its output terminal 15e. In this particular embodiment the transmitted signal may comprise a preamble only (i.e. the transmitted signal does not necessarily need to comprise a data portion). In one embodiment the transmitted signal comprises both a preamble and a data portion which represents data (e.g. a portion representing a series of bits); and the embodiment may comprise the step of transmitting the signal from the electrode of the transmitter to the first and second electrodes 3,5 of the receiver device 1 and determining the data in the data portion of the signal based on the output signals of the comparator 15.

In another embodiment the receiver device 1 is provided in a wearable device which is worn by the user, and the first and second electrode 3,5 both touch the skin of the user. The transmitter is also provided on the same user; preferably the transmitter is also provided in a wearable device which is worn by the user, and the electrode of the transmitter also touches the skin of said user. In this particular example user may arrange the first and second electrodes of the receiver device 1 to capacitive couple with an electrode of a transmitter by simply positioning the wearable device which comprises the receiver device 1 so that the first and second electrodes 3,5 both touch the skin of the user, and by positioning the wearable device which comprises the transmitter so that the electrode of the transmitter touches the skin of the user. So long as the user wears both the wearable devices in this manner then the first and second electrodes of the receiver device 1 will be capacitive coupled with an electrode of a transmitter, and signals can be passed from the electrode of the transmitter, through the body of the user, to the first and second electrodes 3,5 of the receiver device 1. Sending signals through the body of a user, from a transmitter which is worn by said user, to a receiver device 1 which is also worn by the same user, is referred to as intra-body communication.

The signal which is transmitted by the electrode of the transmitter is received at both the first and second electrodes 3,5 of the receiver device 1.

The preamble of the signal which is received at the first electrode 3 is used to charge the first capacitor 9 of the energy harvesting circuit 7. The charged first capacitor 9 is then used to power the comparator 15.

In an embodiment wherein the transmitted signal comprises both a preamble plus a data portion, then the charge which is stored on the first capacitor 9 of the energy harvesting circuit 7 must be large enough to power the comparator 15 for a sufficient time to allow the whole data portion of the signal to the processed at the receiver device 2. For example, if the transmitted signal contains a data portion which is 10 ms long then this will require that the comparator 15 be powered for longer compared to if the transmitted signal contains a data portion which is less than 10 ms long. In one embodiment, in a calibration step, the size or length of the data portion of the signal(s) to be transmitted by the transmitter to the receiver device 1, is identified and the preamble of the signal(s) is tuned (i.e. made longer so as to contain more energy; or made shorter so as to contain less energy) to ensure that the preamble can provide a amount of energy to enable at the first capacitor 9 of the energy harvesting circuit 7 to be charged to a level whereby the first capacitor 9 will have sufficient charge to power the comparator 15 for a period of time sufficient to allow the receiver device 1 to process all of the data portion of the signal.

In another embodiment, wherein the transmitted signal comprises both a preamble plus a data portion; the transmitted signal is received at the first and second electrode 3,5 of the receiver device 1, and at least a part of the data portion of the signal which is received at the second electrode 5 is used to charge both the fifth capacitor 23 of the demodulator circuit 11 and the seventh capacitor 32 of the first filtering circuit 17. The charged fifth capacitor 23 of the demodulator circuit 11 is used to provide an input signal to second input terminal 15b of the comparator 15 and the charged seventh capacitor 32 of the first filtering circuit 17 is used to provide a reference voltage at the first input terminal 15a of the comparator 15.

In the most preferred embodiment the transmitted signal has a frequency of 10 MHz. This is the optimum frequency for transmission of the signal through the body of a user.

Advantageously, in each of the above-mentioned embodiments the reference voltage which is provided to the first terminal 15a of the comparator 15 is provided by the seventh capacitor 32; and seventh capacitor 32 harvests its charge from energy which is provided in the transmitted signal which is received by the second electrode 5. Accordingly, no external voltage source (i.e. battery) is required for providing a reference voltage. Furthermore, voltage required to power the comparator 15 is provided by the first capacitor 9; and this first capacitor 9 harvest its charge from energy which is provided in the transmitted signal which is received at the first electrode 3. Accordingly, no external voltage source (i.e no external battery) is required for powering the comparator 15. As a result a 'zero-power' receiver device 1 is achieved.

The operation of the receiver device 1 will now be described in more detail. We consider first an example wherein the transmitted signal comprises both a preamble plus a data portion (e.g. an initial portion which has a series of bits of value '1', plus a portion which contains a series of bits which define data); FIG. 2a provides an illustration of such a transmitted signal, comprising a preamble 101 plus a data portion 103, wherein voltage is provided on the y-axis and time is provided on the x-axis.

As mentioned above the signal which is transmitted by the electrode of the transmitter is received at both the first and second electrodes 3,5 of the receiver device 1. Accordingly, hereafter, we will refer to said signal as the received signal, since it has been received by the first and second electrodes 3,5 of the receiver device.

After said signal has been received at the first electrode 3 the received signal will also be passed to the demodulator circuit 11 across the second electrode 5. The demodulator circuit 11 will process the received signal and will provide at its output terminal 11b a signal which is the envelope of the received signal. FIG. 2b illustrates the signal (V11b) which results at the output terminal 11b of demodulator circuit 11 after having received the signal of FIG. 2a; wherein voltage is provided on the y-axis and time is provided on the x-axis.

The signal which is provided at the output terminal 11b of the demodulator circuit 11 (i.e. the signal which is the envelope of the signal received at the second electrode 5) is provided to the second terminal 15b of the comparator 15 through the first filter 17. FIG. 2c illustrates the signal (V15b) which results at the second terminal 15b of the comparator 15 when the signal of FIG. 2a is received at the second electrode 5; wherein voltage is provided on the y-axis and time is provided on the x-axis. As can be seen in FIG. 2c the voltage signal (V15b) which results at the second terminal 15b of the comparator 15 is identical to the voltage signal illustrated in FIG. 2b, this is because the output terminal 11b of the demodulator 11 is connected directly to the first terminal 15a of the comparator 15.

The signal which is provided at the output terminal 11b of the demodulator circuit 11 (i.e. the signal which is the envelope of the signal received at the second electrode 5) is also provided to the first filter circuit 17 to generate a reference voltage at the first input terminal 15a of the comparator 15. Said signal which is provided at the output terminal 11b of the demodulator circuit 11 will charge the seventh capacitor 32 in the first filter circuit 17. The seventh capacitor 32 provides a substantially constant reference voltage (V15a) at the first input terminal 15a of the comparator 15.

FIG. 2d illustrates the substantially constant reference voltage (V15a) which results at the first terminal 15a of the comparator 15 when the signal of FIG. 2a is received at the second electrode 5; wherein voltage is provided on the y-axis and time is provided on the x-axis. As can be seen in FIG. 2d the seventh capacitor 32 changes after the received signal is received at the second electrode 5. During time periods t2-to-t3, t4-to-t5, the energy in the received signal is null (i.e. the voltage of the received signal is null); during these time periods the seventh capacitor 32 and fifth capacitor 23 begin to discharge. The seventh capacitor 32 discharges much slower than fifth capacitor 23 due to the second resistance 41 present in the first filter circuit 17 (according to equation 8).

During time periods t3-to-t4, t5-to-t6, the energy in the received signal is non-zero (i.e. the voltage of the received signal is non-zero); during these time periods the seventh capacitor 32 is recharged slower than the fifth capacitor 23, using the energy in received signal. So the voltage provided at the second input terminal 15b of the comparator 15 is provided by the fifth capacitor 23; and so the voltage provided at the second input terminal 15b of the comparator 15 follows the data in the received signal. The voltage at the first input terminal 15a of the comparator 15 is brought again to the reference voltage (V15a); due to the passive low pass filter (defined by the first resistance 35 and the seventh capacitor 32 in the first filter circuit 17) the voltage at the first input terminal 15a of the comparator 15 follows the data in the received signal much slower than the rate which the voltage provided at the second input terminal 15b follows the data in the received signal, thereby allowing the comparator 15 sufficient time to perform a comparison to determine if the bit in the received signal is a '1' or '0'.

The comparator 15 will output at its output terminal 15e a Boolean '1' when the signal at the second input terminal 15b of the comparator has an amplitude which is larger than the signal at the first input terminal 15a of the comparator 15. The comparator 15 will output a Boolean '0' when the signal at the second input terminal 15b of the comparator has an amplitude which is smaller than the signal at the first input terminal 15b of the comparator 15. In this example the reference voltage (V15a) which is provided at the first input terminal 15a of the comparator is, preferably, always smaller than the amplitude of envelope of the received signal which the transmitter uses to indicate a non-zero data (e.g. a Boolean '1'); accordingly in this example, the resulting signal at the output terminal 15e of the comparator 15 will take the form shown in FIG. 2e. Referring to FIG. 2e, during the time period 0-t0 the comparator 15 was not fully on;

specifically during the time period 0-t0 the charge on the first capacitor 9 in the energy harvesting circuit 7 was insufficient to power the comparator 15; hence the output of the comparator 15 during the time period 0-t0 is not a '1' despite the received signal having a non-zero value during this time period.

FIG. 2*f* illustrates the voltage ($V_9$) across the first capacitor 9 in the energy harvesting circuit 7. As mentioned the voltage required to power the comparator 15 is provided by the first capacitor 9; and this first capacitor 9 harvests its charge from energy which is provided in the received signal which is received by the first electrode 3. When the first electrode 3 receives the signal, the first capacitor 9 is charged using preamble 101; during time period 0-to the charge on the first capacitor 9 is increasing, until the first capacitor 9 becomes fully charged by the time t0. The capacitance of the first capacitor 9 should be large enough to allow the first capacitor 9 to store sufficient charge from the preamble to enable the first capacitor 9 to power the comparator 15 for the entire time period of the received signal; in other words the capacitance of the first capacitor 9 should be large enough (and the length of the preamble 101 should be long enough) to allow the first capacitor 9 to store sufficient charge from the preamble to enable the first capacitor 9 to power the comparator 15 up until time t6. The required capacitance of the first capacitor 9 is typically determined in a calibration step whereby the duration of the signals which the transmitter transmits is identified, and the appropriate capacitance for the first capacitor 9 to enable the first capacitor 9 to store charge sufficient to power the comparator 15 for that entire duration of the transmitted signal, is determined.

It can be seen from FIG. 2*a* during time periods t3-to-t4, t5-to-t6, the energy in the received signal is non-zero (i.e. the voltage of the received signal is non-zero); as shown in FIG. 2*f* during these time periods the first capacitor 9 is recharged, using the energy in data portion 103 of the received signal, thus increasing the voltage supplied by the first capacitor 9 to the comparator 15. However, it is most preferable that the capacitance of the first capacitor 9 be such that recharging of the first capacitor using the energy in data portion 103 of the received signal is not necessary; in other words the capacitance of the first capacitor 9 should be large enough (and the length of the preamble 101 should be long enough) such that when the first capacitor 9 is fully charged using the preamble of the preamble, it has sufficient amount of change to power the comparator for the entire time period of the received signal (i.e. until time t6); thus even if entire data portion 103 of the received signal were to be null, then the capacitor would still have sufficient charge (harvested from the preamble alone) to power the comparator 15 (i.e. to maintain the comparator 15 'on').

As shown in FIG. 2*e* the preamble results in a Boolean '1' at the output terminal 15*e* of the comparator 15; since this Boolean '1' does not result from the data portion 103 of the received signal it would result in an error in the deciphering of the received signal unless it is removed. In other words, in this example the data portion of the received signal represents the series of bits '01011'; if on the other hand the Boolean '1' which results from the preamble is not removed the resulting bits read out would be '11101011'. In order to avoid such errors the second filtering circuit 47 is used to filter the signal which is provided at the output terminal 15*e* of the comparator 15. Specifically, the second filter circuit 47 is configured to filter out signals, which are output by the comparator 15, which have a non-zero value for a period less than a predefined threshold period (Tb). The predefined threshold period (Tb) is set during a calibration step; in such a calibration step it is identified what is the minimum period of the signal which the transmitter uses to indicate a non-zero value (e.g. what is the minimum period of the signal which the transmitter uses to indicate a Boolean '1'); the predefined threshold period (Tb) is selected to be equal to said identified minimum period. Selection the suitable values of third resistor 48 and eight capacitor 49 according to the equation 9 is possible to define the predefined threshold period Tb when $V_{47b}$ will reach the value $V_{threshold}$ at the desired predefined threshold period Tb. Also the period of the preamble and the capacitance of the first capacitor 9 are turned so that time remaining in the preamble after the first capacitor 9 has been charged a sufficient amount to power the comparator 15, is less than the predefined threshold period (Tb).

As a result, with respect to the example shown in FIG. 2*e*, in the duration (T0) of the Boolean '1' which results from the preamble is less than the predefined threshold period Tb so that the second filter circuit 47 will filter out this Boolean '1'.

In one embodiment after the second filter 47 generates a signal bigger than the $V_{threshold}$ ('high') an external logic can consider the signals V15*e* output at the output terminal 15 of the comparator as being valid (i.e. have not been generated due to noise). In this example the function of the output 47*b* of the second filter circuit 47 is to alert external logic that the data message (103) is valid. FIG. 2*g* illustrates the resulting signal provided at the output terminal 47*b* of the second filtering circuit 47.

As mentioned the receive device 1 may optionally include a parsing circuit 51. If the receiving device 1 does include a parsing circuit then the use of the receiving circuit may further include the step of using the to monitor for one or more predefined series of signals output from the second filter circuit 47; and to provide predefined output when the parsing circuit detects that the second filter circuit 47 has output a predefined series of signals. For example the parsing circuit 51 may be connected to a plurality of external circuits or external devices, each having a respective address. Each address may be represented by a series of bits (e.g. an 8 bit address). The parsing circuit 51 may be configured to monitor signals output from the second filter circuit 47, and when it detects that a series of bits corresponding to an address of one of the external circuits or external devices have been output by the second filter circuit 47, then the parsing circuit 51 may send an activation signal to that external circuit or external device to activate that external circuit or external device.

As mentioned the receiver device 1 may optionally include a matching circuit 31. If so then the use of the receiver device 1 may include the step of using the matching circuit 31 to match the impedance of the second electrode with the impedance of the demodulator circuit Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:
1. A receiver device comprising,
a first electrode which can capacitive couple to an electrode of a transmitter device;

a second electrode which can capacitive couple to said electrode of said transmitter device;

an energy harvesting circuit, which comprises a first capacitor, wherein said first electrode is electrically connected to the energy harvesting circuit so that energy from a signal which was transmitted from the electrode of the transmitter device and received at the first electrode, can be used to increase voltage across the first capacitor; and a comparator, wherein the first capacitor is electrically connected to a positive supply input terminal of the comparator so that voltage across the first capacitor can be used to power the comparator;

a demodulator circuit having an input and an output, wherein the demodulator circuit is configured to provide at its output the envelope of a signal at said input; wherein said second electrode is electrically connected to the demodulator circuit;

a first filter circuit, which comprises a second capacitor, which is electrically connected to the output of the demodulator circuit, so that energy from a signal which was transmitted from the electrode of the transmitter device and received at the second electrode can be used to increase voltage across the second capacitor;

wherein said output of the demodulator circuit is electrically connected to a second input terminal of the comparator; and wherein the second capacitor is electrically connected to a first input terminal of the comparator so that the voltage across the second capacitor defines a reference voltage at the first input terminal of the comparator;

a second filter circuit which is electrically connected to an output terminal of the comparator, for filtering signals provided at the output terminal of the comparator;

wherein the energy harvesting circuit comprises a first diode and second diode, wherein the first diode is connected between ground and a first node, wherein the first node is between the first and second diodes; the second diode is connected between the first node and a second node, wherein the second node defines an output of the energy harvesting circuit; and wherein the first capacitor is connected between the second node and ground;

wherein the energy harvesting circuit further comprises, an inductor, a harvesting capacitor which is connected between the first node and the inductor, and a further harvesting capacitor which is connected between a third node and ground wherein the third node is a node between the first electrode and the inductor.

2. A receiver device according to claim 1 wherein the first filter circuit comprises, an input node which is electrically connected to the output of the demodulator circuit; a first output node which is electrically connected to the second input terminal of the comparator; a second output node which is electrically connected to the first input terminal of the comparator;

a resistor which is electrically connected between the input node and the second output node;

a further resistor which is connected between the first output node and ground; and wherein the second capacitor is connected between the second output node and ground.

3. A receiver device according to claim 1 wherein the demodulator circuit comprises an input node and an output node wherein the input node defines the input of the demodulator circuit and the output node defines the output of the demodulator circuit; wherein the demodulator circuit further comprises, a capacitor and a diode connected in series between the input node and output node, wherein an intermediate node is defined between said capacitor and diode;

a further capacitor which is connected between the output node of the demodulator circuit and ground; and a further diode which is connected between the intermediate node and ground.

4. A receiver device according to claim 1 wherein the second filter circuit comprises an input terminal which defines an input of the second filter circuit, and an output terminal which defines an output of the second filter circuit, wherein the input terminal of the second filter circuit is connected to the output terminal of the comparator so that the second filter circuit can receive signals which are output by the comparator; and wherein the second filter circuit further comprises a diode, a resistor and a capacitor, wherein said diode and said resistor are connected in series between the input terminal and the output terminal, and the capacitor is electrically connected between the output terminal and ground.

5. A receiver device according to claim 1 further comprising an impedance matching circuit which is configured to match an input impendence of the second electrode with an input impedance of the demodulator circuit.

6. A receiver device according to claim 1 the receiver device further comprises a parsing circuit which is electrically connected to both an output terminal of the second filter circuit and to the output terminal of the comparator; and wherein the parsing circuit configured to read the signals provided at the output terminal of the comparator only after the parsing circuit has received predefined series of signals from the output terminal of the second filter circuit.

7. A receiver device according to claim 6 wherein the parsing circuit is connected to a plurality of sub-circuits, each sub circuit having a respective address; and wherein the parsing circuit configured to provide an output which enables a sub-circuit in response to the parsing circuit reading a predefined series of signals at the output terminal of the comparator, said read predefined series of signals corresponding to the address of that sub-circuit.

8. A receiver device according to claim 1 wherein the receiver device is configured to be a wearable, and the wherein the first and second electrodes are arranged such that they contact the skin of a user when the user wears the receiver device.

9. An assembly comprising, one or more transmitters which are configured to transmit a signal which comprises a preamble, and one or more receiver devices according to claim 1.

10. An assembly according to claim 9 wherein said one or more transmitters are configured to transmit a signal which comprises a preamble and data.

11. An assembly according to claim 9 wherein said one or more transmitters are configured to transmit the signal though the body of a user that is wearing said one or more receiver devices, to the respective first and second electrodes of the one or more receiver devices.

12. A method of communicating a signal from a transmitter to a receiver device according to claim 1, the method comprising, transmitting a signal comprising a preamble from an electrode of the transmitter to both the first and second electrodes of the receiver device;

receiving said signal at the first and second electrode;

using energy from the preamble of the signal received at the first electrode to increase the voltage across the first capacitor;

using the voltage across the first capacitor to power the comparator;

using energy from the signal received at the second electrode to increase the voltage across the second capacitor of the first filter circuit;

using the voltage across the second capacitor to provide the reference voltage at the first input terminal of the comparator.

13. A method according to claim 12 wherein the step of using energy from the signal received at the second electrode to increase the voltage across the second capacitor of the first filter circuit, comprises, using energy from the preamble of the signal received at the second electrode to increase the voltage across the second capacitor; and/or using energy from a portion of said signal which represents one or more data bits to increase the voltage across the second capacitor.

14. A method according to claim 12 wherein the method further comprises the step of detecting a predefined sequence of signal outputs from the comparator, wherein said detected sequence of signal outputs corresponds to an address of an external circuit or device; and in response to detecting the predefined sequence of signal outputs, sending an activation signal to the external circuit or device which has an address corresponding to the detected sequence of signal outputs which activates the external circuit or device.

* * * * *